(12) United States Patent
Sasaki et al.

(10) Patent No.: US 6,618,672 B2
(45) Date of Patent: Sep. 9, 2003

(54) VEHICLE-APPLIED REAR-AND-SIDE MONITORING SYSTEM

(75) Inventors: Kazuyuki Sasaki, Shizuoka (JP);
Naoto Ishikawa, Shizuoka (JP);
Kazutomo Fujinami, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/983,016

(22) Filed: Oct. 22, 2001

(65) Prior Publication Data

US 2002/0087269 A1 Jul. 4, 2002

Related U.S. Application Data

(63) Continuation-in-part of application No. 09/421,244, filed on Oct. 20, 1999, now abandoned.

(51) Int. Cl.[7] .............................................. G06F 17/10
(52) U.S. Cl. ......................... 701/301; 701/28; 701/96; 340/435; 340/436
(58) Field of Search ........................... 701/28, 96, 301; 340/425.5, 435, 436, 438, 937

(56) References Cited

U.S. PATENT DOCUMENTS

| 4,757,387 A | 7/1988 | Saito | 358/225 |
|---|---|---|---|
| 6,101,048 A | 8/2000 | Wheeler | 359/742 |

Primary Examiner—Gertrude Arthur
(74) Attorney, Agent, or Firm—Armstrong, Westerman & Hattori, LLP

(57) ABSTRACT

A vehicle-applied rear-and-side monitory system including an image taking means for taking an image of a rear-and-side view of the subject vehicle traveling in a lane; a characteristic point extracting device for extracting at least one point as a characteristic point from an image of a following vehicle contained in a first image, taken at a first time-point, of the rear-and-side view, the following vehicle traveling at the rear of the subject vehicle in the lane of the subject vehicle or in a neighboring lane; a corresponding point detecting device for detecting a corresponding point, corresponding to the characteristic point, in a second image taken at a second time-point following the first time-point; an optical flow forming device for forming an optical flow of the characteristic point of the following vehicle from a vector connecting the characteristic point and the corresponding point; and a dead angle area located vehicles-distance calculating device for calculating at least any one of a vehicles-distance between the subject vehicle and the following vehicle and a relative position therebetween after a time-point of disappearance of the optical flow outside an image plane of the image taking device on the basis of the optical flow formed just before the disappearance. Thus, a vehicle-applied rear-and-side monitoring system capable of monitoring an approaching degree of a following vehicle approaching from the rear of the subject vehicle in the lane of the subject vehicle in the neighboring lane can be realized.

13 Claims, 7 Drawing Sheets

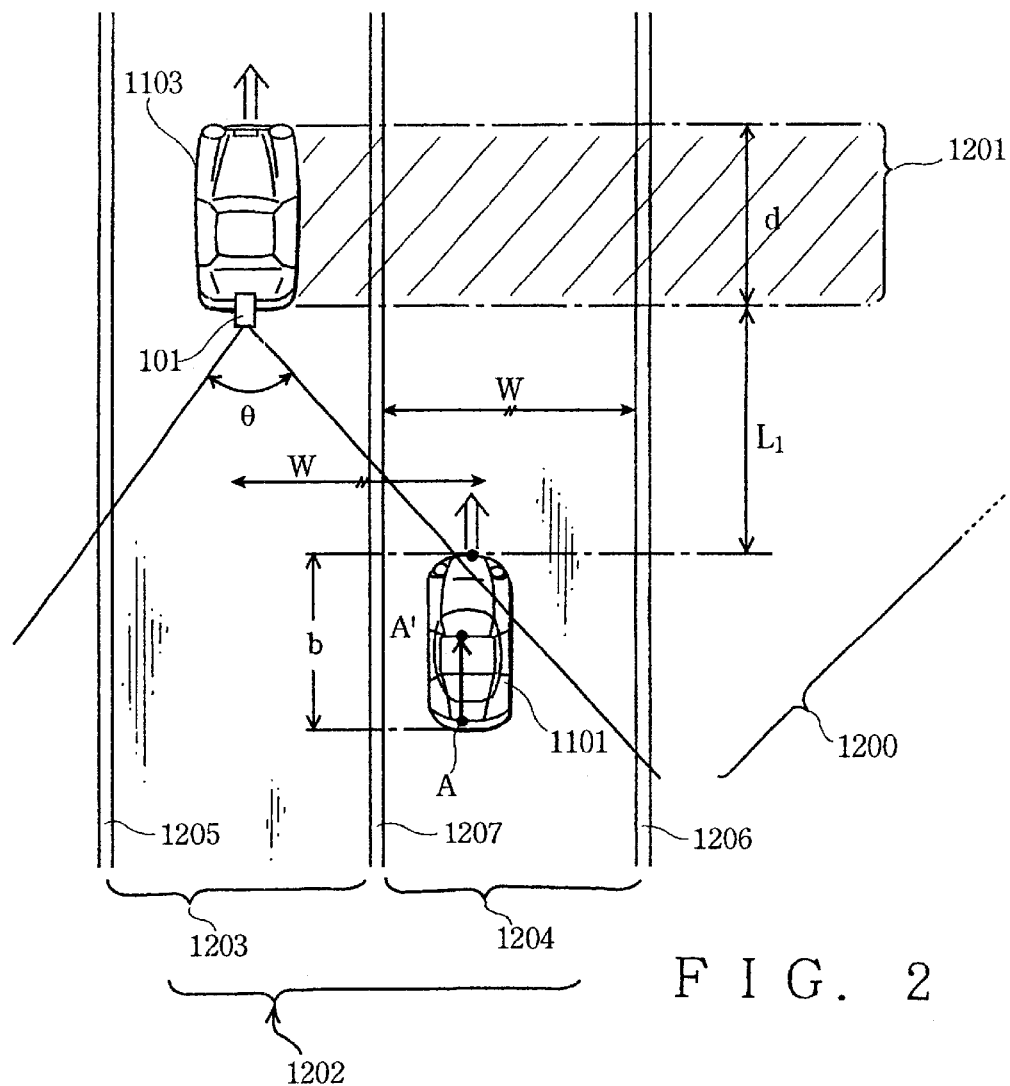
F I G. 2
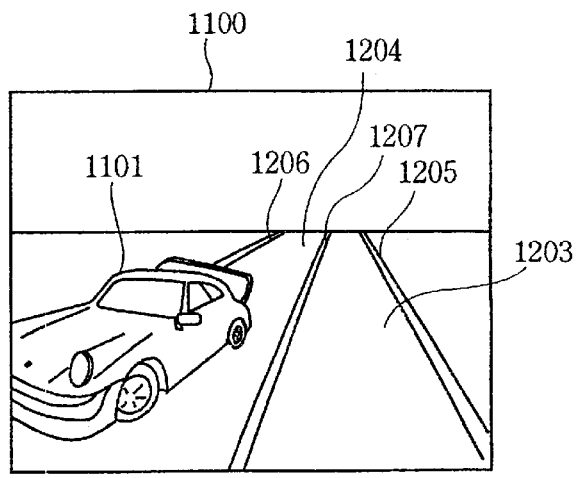
F I G. 3

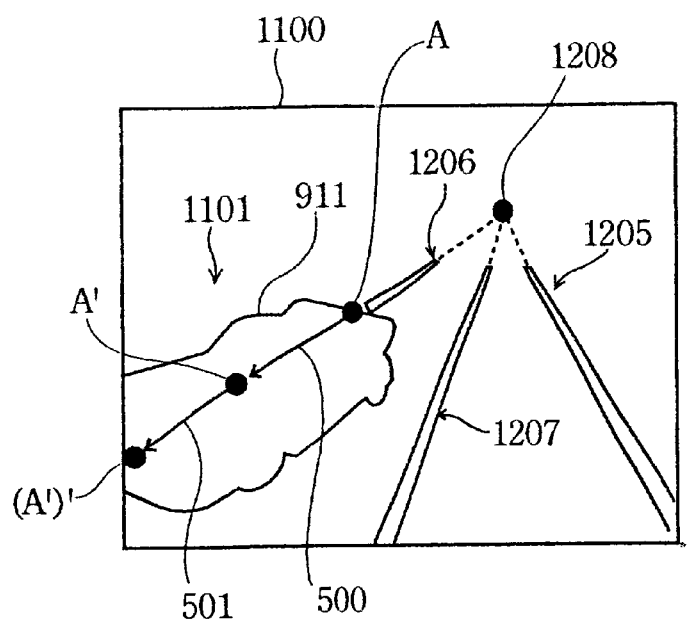
F I G. 4
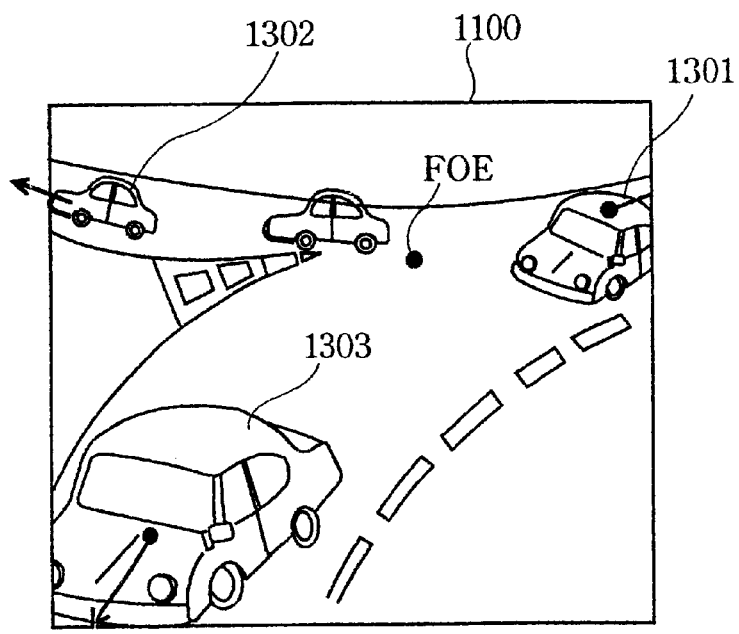
F I G. 8

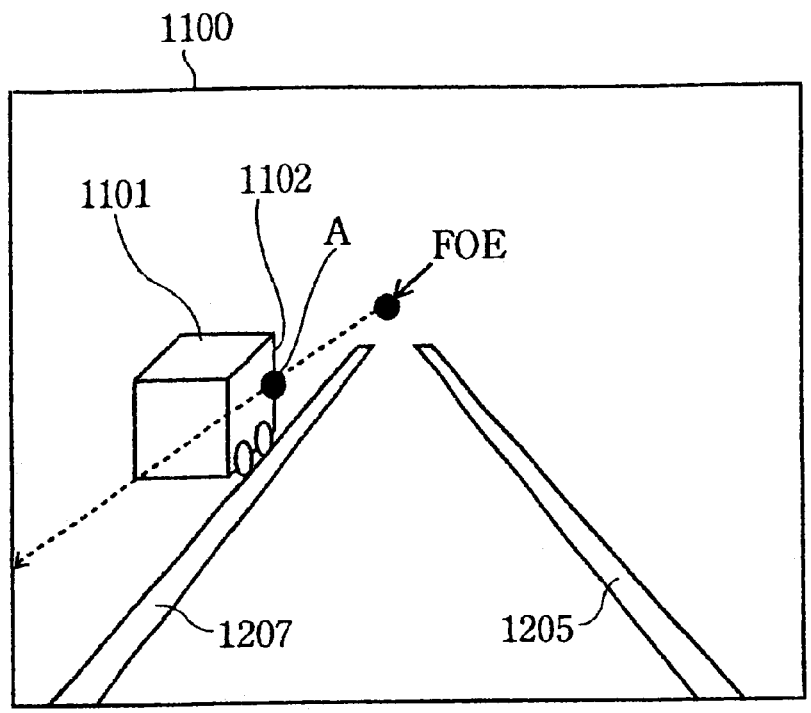
PRIOR ART  F I G. 9 A
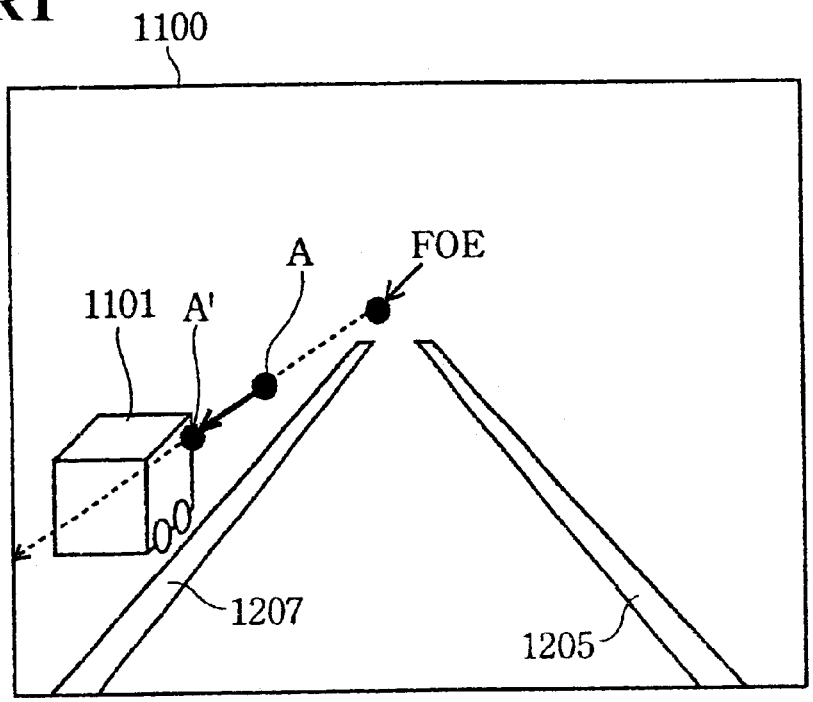
PRIOR ART  F I G. 9 B

VEHICLE-APPLIED REAR-AND-SIDE MONITORING SYSTEM

This application is a continuation-in-part (CIP) of prior application Ser. No. 09/421,244 filed Oct. 20, 1999, now abandoned.

BACKGROUND OF THE INVENTION

1. Field of the Invention

The present invention generally relates to a vehicle-applied monitoring system and more particularly, to a vehicle-applied rear-and-side monitoring system which takes an image of a rear-and-side view of a running vehicle by means of an imaging apparatus such as a small-sized Charge Coupled Device (hereinafter CCD) mounted on the vehicle, detects a following vehicle in a the taken image, and gives a driver an alarm or the like indicating the approach of the following vehicle.

2. Description of Related Art

There exists dangerousness of a big traffic accident due to a dead angle area when a running vehicle changes a lane. For example, if a driver of a preceding vehicle executes a lane change without recognizing a following vehicle having entered the dead angle area, such a traffic accident as a collision would happen.

In order to prevent the above-described accident or dangerous situation, technology to make a driver accurately and surely recognize the existence of the following vehicle has been proposed.

For example, Japanese Patent Application Laid-open No. 1-189289 (hereinafter JP '289) discloses a vehicle information-display system which makes a driver recognize a vehicle running on th neighboring lane or at the back of the own vehicle. The prior art disclosed in JP '289 can makes a driver recognize a vehicle running on the neighboring lane or at the back of the own vehicle by taking an image of a rear-and-side view of the own vehicle with a camera and by showing the taken image on a monitoring display.

With respect to the above prior art, however, a driver has to watch the monitoring display carefully while driving so as to check the existence of a following vehicle, and further it would be difficult to judge whether the following vehicle is approaching the own vehicle or not.

Therefore, a vehicle-applied rearward monitoring system and vehicle-applied rearward monitoring method using this system have been proposed, wherein a relative speed, a relative distance, and/or a relative position between the own vehicle and the following vehicle running at the back of the own vehicle or on the neighboring lane are obtained by calculating a infinity point (or a disappearance point) which is generally called "Focus of Expansion" (hereinafter FOE), which FOE is a point where every points of an image taken by a video camera converge, by extracting a characteristic point from an image recognized as the following vehicle, and by calculating movement of the characteristic point. Hereinafter, the movement of the characteristic point is called optical flow.

Here, a rear monitoring method with the above conventional vehicle-applied rearward monitoring system will be briefly described below with reference to FIGS. 9A and 9B.

FIGS. 9A and 9B are schematic views showing an example of sequential images of a rear-and-side view taken by a rearward monitoring camera, i.e., the image taking means, backward-lookingly mounting on a rear portion of the own vehicle and imaged on the image plane 1100 of an image sensor such as a CCD image sensor of the camera. In FIGS. 9A and 9B, the following vehicle 1101 is passing the own vehicle. Here, references numerals 1205 and 1207 indicate lane markings on the road.

First, referring to FIG. 9A, an image of the following vehicle 1101 is recognized in an image of a rearward view in the image plane 1100.

Conventionally, a boundary, i.e., an edge, between an image of the following vehicle 1101 and images of the others such as the road, a background and the like (not shown), which are imaged on the image place 1100, is recognized by making use of a luminance difference therebetween.

After recognition of the edge of the image of the following vehicle 1101, the characteristic point A fitting to predetermined conditions is extracted by recognizing the edge or an area within the edge.

Further, at the next time-point, a corresponding point A' is detected to form an optical flow connecting the points A and A'.

The degree of dangerousness of movement of the following vehicle 1101 is judged on the basis of the optical flow of the following vehicle 1101. In case the following vehicle 1101 has been calculated to be in a dangerous position, an alarm is given to a driver to prevent the danger if fa direction indicator is put on.

With respect to the above conventional vehicle-applied rearward monitoring system, however, there is drawback mentioned below.

Here, FIG. 7 is a schematic view showing an example of relative position between own vehicle 1103 running on the road 1202 and provided with the conventional vehicle-applied rearward monitoring system and the following vehicle 1101. Reference numeral 1201 indicates a side area band of the own vehicle 1103. And, reference numerals 1203 and 1204 indicate left and right traffic lanes, respectively, and reference numerals 1205, 1206, and 1207 indicate lane markings in the road 1202. Further, reference character θ indicates an image taking angle.

Referring to FIG. 7, in case that the following vehicle 1101 has entered a dead angle area 1200 of an image taking means 1104 mounted on the own vehicle 1103, the following vehicle 1101 cannot be detected or calculated with the conventional vehicle-applied rearward monitoring system.

If the own vehicle 1103 executes a lane change when the following vehicle 1101 has entered the dead angle area 1200, a big traffic accident, such as a collision, would happen.

SUMMARY OF THE INVENTION

In view of the foregoing, an object of the present invention is to provide a vehicle-applied rear-and-side monitoring system which can accurately and surely detect and calculate the existence of the following vehicle having entered a dead angle area of the own vehicle.

In order to achieve the above-described object, as a first aspect of the present invention, a vehicle-applied rear-and-side monitoring system of the present invention includes: an image taking means for taking an image of a rear-and-side view of an own vehicle being running on a lane; and a characteristic point extracting means for extracting at least one point as a characteristic point from an image of a following vehicle contained in a first image, taken at a first time-point, of the rear-and-side view, the following vehicle being running at the back of the own vehicle on the lane or on a neighboring lane of the lane; a corresponding point detecting means for detecting a corresponding point, corresponding to the characteristic point, in a second image taken at a second time-point following the first time-point; an optical flow forming means for forming an optical flow of the characteristic point of the following vehicle from a vector connecting the characteristic point and the corresponding point; and a dead angle area located vehicles-distance calculating means for calculating at least any one of a vehicles-distance between the own vehicle and the following vehicle and a relative position therebetween after a time-point of disappearance of the optical flow outside an image place of the image taking means on the basis of the optical flow formed just before the disappearance, wherein an approaching degree of the following vehicle being running at the back of the own vehicle on the lane or on the neighboring lane is monitored.

According to the above-described structure, by showing the calculated results of the vehicles-distance or the relative position on an image place of the displaying means using, for example, a liquid crystal display panel, a driver can surely recognize an existence of the following vehicle having entered the dead angle area of the own vehicle.

As a second aspect of the present invention, in the structure with the above first aspect, the dead angle area located vehicles-distance calculating means considers that the optical flow of the characteristic point of the following vehicle having arrived at a predetermined peripheral area of the image plane of the image taking means at the first time-point disappears from the image plane at the second time-point, uses the optical flow at the first time-point as the optical flow formed just before the disappearance, and calculates at least any one of the vehicles-distance and the relative position after the first time-point or after the second time-point.

According to the above-described structure, since the dead angel area located vehicles-distance calculating means considers that the optical flow having arrived at the predetermined peripheral area of the image plane will disappear from the image plane at the next time-point and continues the calculation, a driver can surely recognize an existence of the following vehicle having entered the dead angle area of the own vehicle.

As a third aspect of the present invention, the vehicle-applied rear-and-side monitoring system with the above first aspect further includes a dangerousness judging means for judging degree of danger of contact or collision with the following vehicle on the basis of the vehicles-distance and the relative position having been calculated by the dead angle area located vehicles-distance calculating means.

According to the above-described structure, since the dangerousness judging means judges degree of danger of contact or collision with the following vehicle every moment on the basis of the vehicles-distance and the relative position having been calculated by the dead angle area located vehicles-distance calculating means, the danger of contact or collision can be prevented by warning a driver with a display, an alarm buzzer, or the like.

As a fourth aspect of the present invention, the vehicle-applied rear-and-side monitoring system with the above first aspect further includes an alarm giving means for giving an alarm indicating danger by means of at least any one of auditory information and optical information in case that an operation for activating a direction indicator provided on the own vehicle is executed when the vehicles-distance or the relative position having been calculated by the dead angle area located vehicles-distance calculating means is within a predetermined range.

According to the above-described structure, though execution of a lane change or the like by the own vehicle in a state that the following vehicle has entered the dead angle area of the own vehicle would cause such a big accident as a collision of the own vehicle against the following vehicle, since the alarm giving means gives a driver an alarm indicating danger by means of auditory or optical information in case that an operation for activating the direction indicator provided on the own vehicle is executed when the following vehicle is in the dead angle area, such a big accident as a collision can be prevented.

As a fifth aspect of the present invention, in the structure with the above second aspect, the dead angel area located vehicles-distance calculating means calculates neither the vehicles-distance nor the relative position after the first time-point or after the second time point in case that the optical flow having arrived at the predetermined peripheral area of the image plane of the image taking means at the first time-point has a directional component corresponding to a direction within a range between horizontal and upward-vertical in the rear-and-side view, and calculates at least any one of the vehicles-distance and the relative position after first time-point or after the second time-point in case that the optical flow having arrived at the predetermined peripheral area of the image plane of the image taking means at the first time-point has a directional component corresponding to a direction within a range between horizontal (not included) and downward-vertical in the rear-and-side view.

According to the above-described structure, since the dead angle area located vehicles-distance calculating means executes the calculation only when the following vehicle is certainly entering the dead angle area, a driver can recognize dangerousness correctly.

As a sixth aspect of the present invention, the vehicle-applied rear-and-side monitoring system with any one of the above first to fifth aspects further includes a second alarm giving means for giving an alarm indicating danger of a lateral collision by means of at least any one of auditory information and optical information in case that an operation for lane change is executed within a predetermined time period from the time-point of the disappearance of the optical flow from the image plane of the image taking means.

According to the above-described structure, since the second alarm giving means does not take account of the vehicles-distance between the own and following vehicles and the relative position therebetween, calculation can be simplified and the alarm can be utilized as provisional alarm, for example.

As a seventh aspect of the present invention, a vehicle-applied rear-and-side monitoring system of the present invention includes: an image taking means for taking an image of a rear-and-side view of an own vehicle traveling in a lane; a characteristic point extracting means for extracting at least one point as a characteristic point from an image of a following vehicle contained in a first image, taken at a first time-point, of the rear-and-side view, the following vehicle traveling at the rear of the own vehicle in the lane or in a neighboring lane; a corresponding point detecting means for detecting a corresponding point, corresponding to the characteristic point, in a second image taken at a second time-point following the first time-point; an optical flow forming means for forming an optical flow of the characteristic point of the following vehicle from a vector connecting the characteristic point and the corresponding point; and a dead angle area located vehicles-distance calculating means for calculating at least any one of a vehicles-distance between the own vehicle and the following vehicle and a relative position therebetween after a time-point of disappearance of the optical flow outside an image plane of the image taking means on the basis of a plurality of optical flows including said optical flow formed just before said disappearance, wherein an approaching degree of the following vehicle being running at the rear of the own vehicle in the lane or in the neighboring lane is monitored.

According to the above-described structure, by showing the calculated results of the vehicles-distance or the relative position on an image plane of the displaying means using, for example a liquid crystal display panel, a driver can more surely recognize an existence of the following vehicle having entered the dead angle area of the own vehicle.

As an eighth aspect of the present invention, in the structure with the above seventh aspect, the dead angle area located vehicles-distance calculating means calculates the vehicles-distance or the relative position on the basis of a relative speed expected from a relative acceleration obtained from relative speeds corresponding to the plurality of optical flows.

According to the above-described structure, the dead angle area located vehicles-distance calculating means can calculate the vehicles-distance or the relative position more precisely.

As a ninth aspect of the present invention, in the structure with the above eight aspect, the dead angle area located vehicles-distance calculating means calculates the vehicles-distance or the relative position on the basis of both the expected relative speed and a relative traveling direction, of a second vehicle relative to a first vehicle, expected from direction change values of the plurality of optical flows.

According to the above-described structure, the dead angle area located vehicles-distance calculating means can calculate the vehicles-distance or the relative position still more precisely.

The above and other objects and features of the present invention will become more apparent from the following description taken in conjunction with the accompanying drawings.

BRIEF DESCRIPTION OF THE DRAWINGS

FIG. 2 is a schematic view showing an example of relative position between an own vehicle being running on the road and provided with the vehicle-applied rear-and-side monitoring system of the present invention and a following vehicle;

FIG. 3 is a schematic view showing an example of an image of the state of FIG. 2 imaged on an image place of an image taking means through a lens;

FIG. 4 is a schematic view showing an example of an image of an edge of the following vehicle detected in the image of FIG. 3;

FIG. 8 is a schematic view showing an example of an image, imaged on the image plane of the image taking means through a lens, of the following vehicle running on the road having a relative large curvature; and FIGS. 9A and 9B are schematic views showing an example of sequential images of a rear-and-side view taken by a rearward monitoring camera, i.e., the image taking means, backward-lookingly mounted on a rear portion of the own vehicle and imaged on the image plane of an image sensor such as a CCD image sensor of the camera.

DESCRIPTION OF THE PREFERRED EMBODIMENT

An embodiment of the vehicle-applied rear-and-side monitoring system in accordance with the present invention will now be described in further detail with reference to the accompanying drawings.

Figure 1:
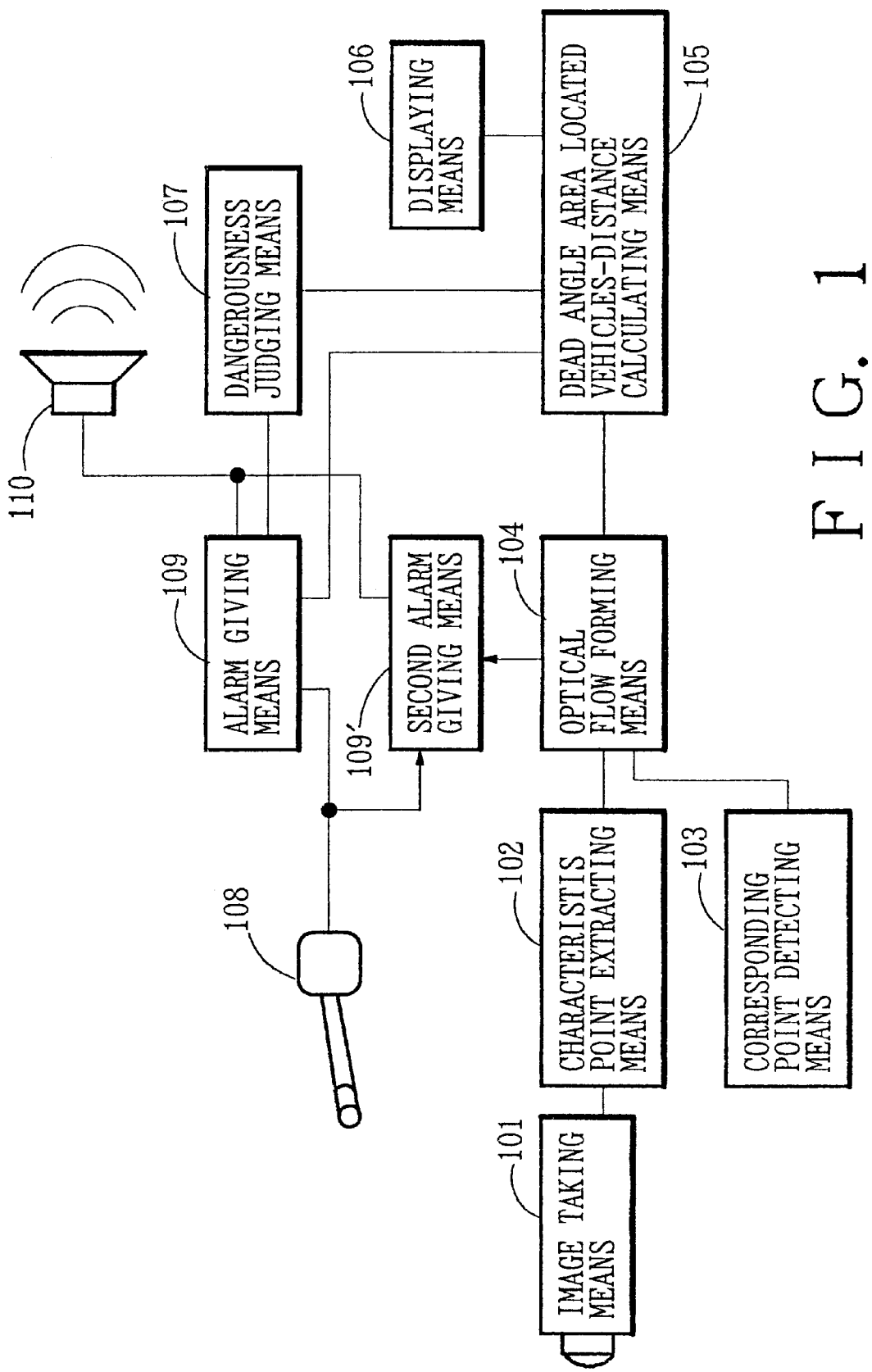
FIG. 1 is a block diagram showing a main scheme of a vehicle-applied rear-and-side monitoring system in accordance with the present invention.

FIG. 1 is a block diagram showing a main scheme of a vehicle-applied rear-and-side monitoring system in accordance with the present invention.

The vehicle-applied rear-and-side monitoring system of the present invention includes: an image taking means 101 for taking an image of a rear-and-side view of an own vehicle traveling in a lane; a characteristic point extracting means 102 for extracting at least one point as a characteristic point from an image of a following vehicle contained in a first image, taken at a first time-point, of the rear-and-side view, the following vehicle traveling at the rear of the own vehicle in the lane or in a neighboring lane, a corresponding point detecting means 103 for detecting a corresponding point, corresponding to the characteristic point, in a second image taken at a second time-point following the first time-point; an optical flow forming means 104 for forming an optical flow of the characteristic point of the following vehicle from a vector connecting the characteristic point and the corresponding point; and a dead angle area located vehicles-distance calculating means 105 for calculating at least any one of a vehicles-distance between the own vehicle and the following vehicle and a relative position therebetween after a time-point of disappearance of the optical flow outside an image plane of the image taking means 101 on the basis of the optical flow formed just before the disappearance, wherein an approaching degree of the following vehicle being running at the back of the own vehicle on the lane or on the neighboring lane is monitored.

More specifically, the dead angle area located vehicles-distance calculating means 105 considers that the optical flow of the characteristic point of the following vehicle arrived at a predetermined peripheral area of the image plane of the image taking means 101 at the first time-point disappears from the image plane at the second time-point, uses the optical flow at the fist time-point as the optical flow formed just before the disappearance, and calculates at least any one of the vehicles-distance and the relative position after the first time-point or after the second time-point.

If data of the vehicles-distance and the relative position between the own vehicle and the following vehicle, which has been calculated by the dead angle area located vehicles-distance calculating means 105, is shown on the image plane of the displaying means 106 using a liquid crystal display panel for example, a driver can surely recognize the following vehicle which is in the dead angle area of the own vehicle and therefore is almost difficult to be recognized by eyes.

Also, the dead angle located vehicles-distance calculating means 105 includes a dangerousness judging means 107 for judging degree of danger of contact or collision with the following vehicle on the basis of the vehicles-distance and the relative position having been calculated by the dead angle area located vehicles-distance calculating means 105.

That is, the dangerousness judging means 107 judges degree of danger of contact or collision with the following vehicle every moment on the basis of the vehicles-distance and the relative position having been calculated by the dead angle area located vehicles-distance calculating means 105, and accordingly the danger of contact or collision can be prevented by warning the driver with an alarm buzzer 110 in case that the danger is beyond a predetermined level.

With regard to a judging technique of dangerousness, judging criteria applied to a conventional vehicle-applied rear-and-side monitoring system can be utilized, or, especially, a criterion for dangerousness of the following vehicle having entered the dead angle area of the own vehicle 1200 may be newly made up.

Further, the vehicle-applied rear-and-side monitoring system includes an alarm giving means 109 for giving an alarm indicating danger by means of at least any one of auditory information and optical information in case that an operation for activating a direction indicator 108 provided on the own vehicle is executed when the vehicles-distance or the relative position having been calculated by the dead angle area located vehicles-distance calculating means 105 is within a predetermined range.

Still further, the vehicle-applied rear-and-side monitoring system includes a second alarm giving means 109' for giving an alarm indicating danger of a lateral collision by means of at least any one of auditory information and optical information in case that an operation for lane change is executed within a predetermined time period from the time-point of the disappearance of the optical flow from the image plane of the image taking means 101.

Figure 7:
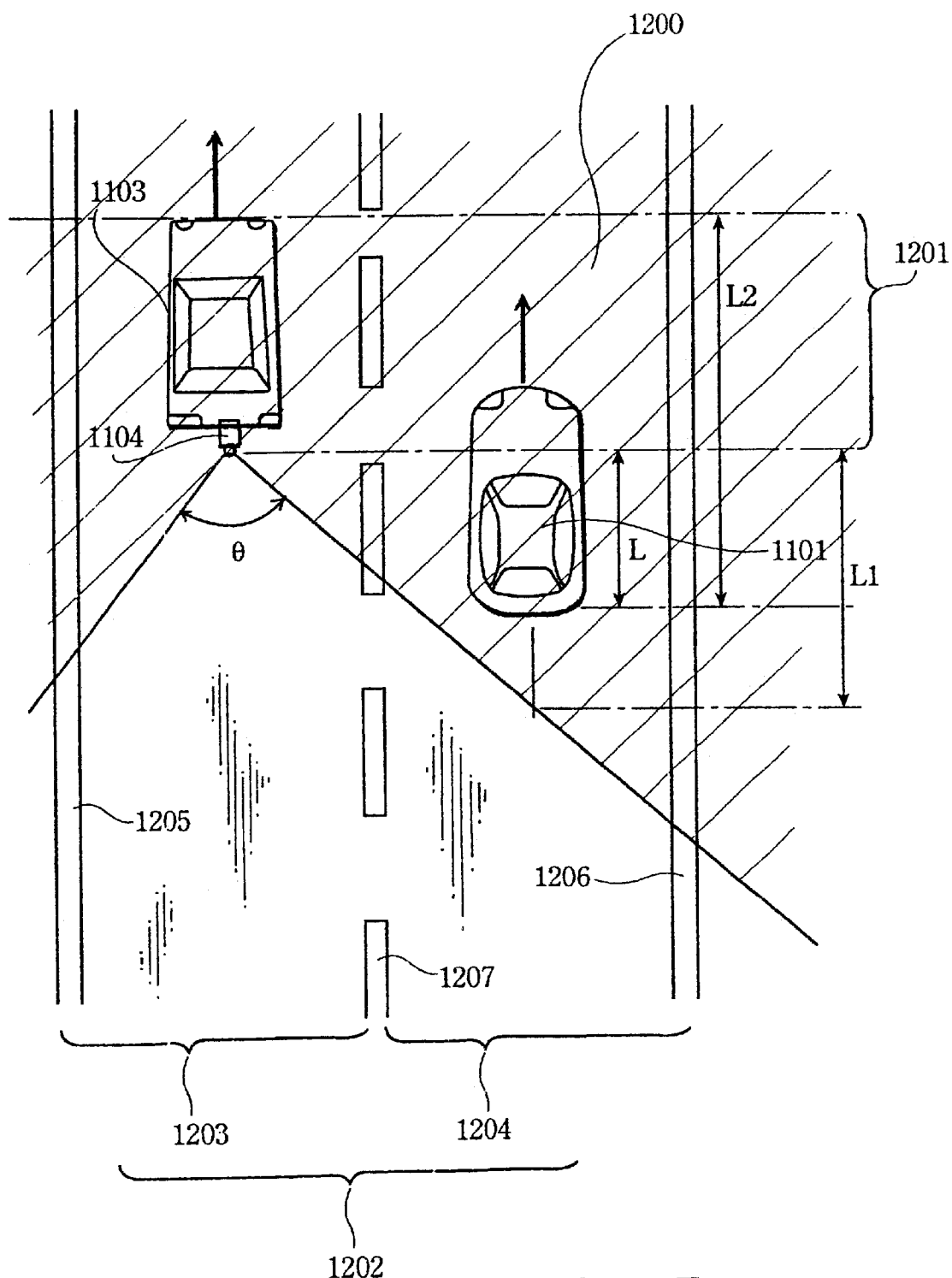
FIG. 7 is a schematic view showing an example of relative position between an own vehicle being running on the road and provided with a conventional vehicle-applied rearward monitoring system and a following vehicle.

Execution of a lane change or the like by the own vehicle 1103 in a state that the following vehicle 1101 has entered the dead angle area 1200 of the own vehicle 1103 as shown in FIG. 7 would cause such a big accident as a collision of the own vehicle 1103 against the following vehicle 1101. Therefore, in case that an operation for activating the direction indicator 108 provided on the own vehicle 1103 is executed when the following vehicle 1101 is in the dead angle area 1200, the alarm giving means 109 gives a driver an alarm indicating danger by means of such auditory information as sounding an alarm buzzer 110.

In addition, the dead angle area located vehicle-distance calculating means 105 calculates neither the vehicles-distance nor the relative position after the first time-point or after the second time-point in case that the optical flow arrived at the predetermined peripheral area of the image plane of the image taking means 101 at the first time-point has a directional component corresponding to a direction within a range between horizontal and upward-vertical in the rear-and-side view.

The dead angle area located vehicles-distance calculating means 105 calculates at least any one of the vehicles-distance and the relative position after the first time-point or after the second time-point in case that the optical flow arrived at the predetermined peripheral area of the image plane of the image taking means 101 at the first time-point has a directional component corresponding to a direction within a range between horizontal (not included) and downward-vertical in the rear-and-side view.

Next, function and action of the above-described means will be described below.

The image taking means 101 is such an imaging apparatus as an imaging camera using such an image taking device as a CCD image sensor and, as shown in FIG. 2, is arranged at the rear end portion of the own vehicle 1103 for taking an image of the rear-and-side view within an area according to an image taking angle θ.

FIG. 3 is a schematic view showing an example of an image of the state of FIG. 2 imaged on the image plane 110 of the image taking means 101 through a lens. In FIG. 3, the same portions have the same reference characters as in FIGS. 8, 9A and 9B.

The characteristic point extracting means 102 recognizes a boundary, i.e., an edge, between an image of the following vehicle 1101 and images of the others such as the road, a background and the like (not shown), which are imaged on the image plane 110, by making use of a luminance difference therebetween.

FIG. 4 is a schematic view showing an example of an image of an edge of the following vehicle detected in the image of FIG. 3. For raising a detecting precision of the edge, an image processing technique such as the edge highlighting by the differentiation process, noise removal using the spatial filtering and the like maybe adopted as its preceding process.

With regard to the image processing, a conventional image processing can be suitably utilized.

After recognition of the edge of the image of the following vehicle 1101, the characteristic point A fitting to predetermined conditions is extracted by recognizing the edge or an area within the edge.

That is, the characteristic point extracting means 102 extracts the characteristic point A fitting to predetermined conditions from the edge 911 of the following vehicle 1101 shown in FIG. 4.

As the predetermined conditions, for example, the coordinates of one point of the edge 911 corresponding to the most rear end or the most front end of the following vehicle 1101 in the image plane 1100 may be selected.

Otherwise, a position, on the edge of the image of the following vehicle 1101, nearest to the FOE may be extracted as the characteristic point A. That is, the center of the edge of a position remotest from the own vehicle may be extracted as the characteristic point A.

Almost simultaneously with the extraction of the characteristic point A of the following vehicle 1101, the characteristic point extracting means 102 detects the FOE 1208 by a FOE detecting portion (not shown) formed therein.

For detecting the FOE 1208, the image taken by the image taking means 101 is converted to an image signal which is provisionally transferred to a frame-memory, and the FOE detecting portion detects the infinity point, i.e., FOE 1208, out of two sequential image frames on the basis of the image signal.

On the basis of the FOE 1208 and the characteristic point A, the corresponding point detecting means 103 detects a corresponding point A', corresponding to the characteristic point A, in the next frame image to be taken after an image taking period Δt from the time-point of the frame image having the characteristic point A. The corresponding point A' shall be detected on a straight line connecting the characteristic point A and the FOE 1208.

Following the above, the optical flow forming means 104 forms an optical flow 500 from a vector starting the characteristic point A to the corresponding point A'.

The still next frame image is taken, and the corresponding point A' is substituted for the characteristic point A and a corresponding point (A')' in the still next frame image is substituted for the characteristic point A'. The above process is iterated succeedingly at every image taking timing in order to obtain the optical flow 500 at every image taking timing.

The optical flow 500 changes its direction and absolute value every moment according to change of a relative position between the following vehicle 1101 and the own vehicle 1103. In case that the following vehicle 1101 is running faster than the own vehicle 1103, the following vehicle 1101 catches up with the own vehicle 1103 and a state shown in FIG. 3 will arise.

In other words, the following vehicle 1101 is proceeding to a position of getting out of the image plane 1100, that is, the following vehicle 1101 is entering the dead angle area 1200. The, the rear end portion of the following vehicle 1101 corresponding to the characteristic point A will disappear from an image taking area (θ) corresponding to limits of the image plane 1100. Conventionally, movement of the following vehicle 1101 after the disappearance cannot be recognized.

Therefore, in the vehicle-applied rear-and-side monitoring system of the present invention includes, the dead angle area located vehicles-distance calculating means 105 calculates a vehicles-distance L between the own vehicle 1103 and the following vehicle and a relative position P(X, Y, Z,) therebetween after a time-point of disappearance of the optical flow 500 outside the image plane 1100 of the image taking means 1011on the basis of the optical flow 500 formed just before the disappearance.

Otherwise, the dead angle area located vehicles-distance calculating means 105 may calculate the vehicles-distance L and the relative position P(X, Y, Z) after a time-point of disappearance of the optical flow 500 outside the image plane 1100 of the image taking means 101 on the basis of the plurality of optical flows, corresponding to the succeeding characteristic/corresponding points A, A', (A')' . . . , including the optical flow formed just before the disappearance.

In case the following vehicle 1101 has been calculated to be in a specially dangerous position such as the area band 1201, the dangerousness judging means 107 judges to be dangerous and further if the direction indicator 108 is put on, the alarm giving means 109 warns a driver with an alarm buzzer 110 or the like so that the danger can be prevented.

Next, the function and action of the dead angle area located vehicles-distance calculating means 105, which calculates movement of the following vehicle 1101 when the following vehicle 1101 entered the dead angle area 1200 of the own vehicle 1103, will be described below in detail.

As shown in FIG. 3 or FIG. 4, in case that the following vehicle 1101 is running faster than the own vehicle 1103, the following vehicle 1101 catches up with the own vehicle 1103 and enters the dead angle area 1200 of the image taking means 101.

In compliance wit the above, through the characteristic point A (that is, the following points A', (A')' . . . , gets out of the limits of the image plane 1100 and disappears, the dead angle area located vehicles-distance calculating means 105 calculates movement of the following vehicle 1101 which cannot be imaged by the image taking means 101, using the optical flow 501 having formed at a time-point of one frame prior to the disappearance.

Next, on the basis of the optical flow 501, function and action for calculating the vehicles-distance and the relative position between the following vehicle 1101 and the own vehicle 1103 after the disappearance of the characteristic point A will be described below in detail.

Figure 5:
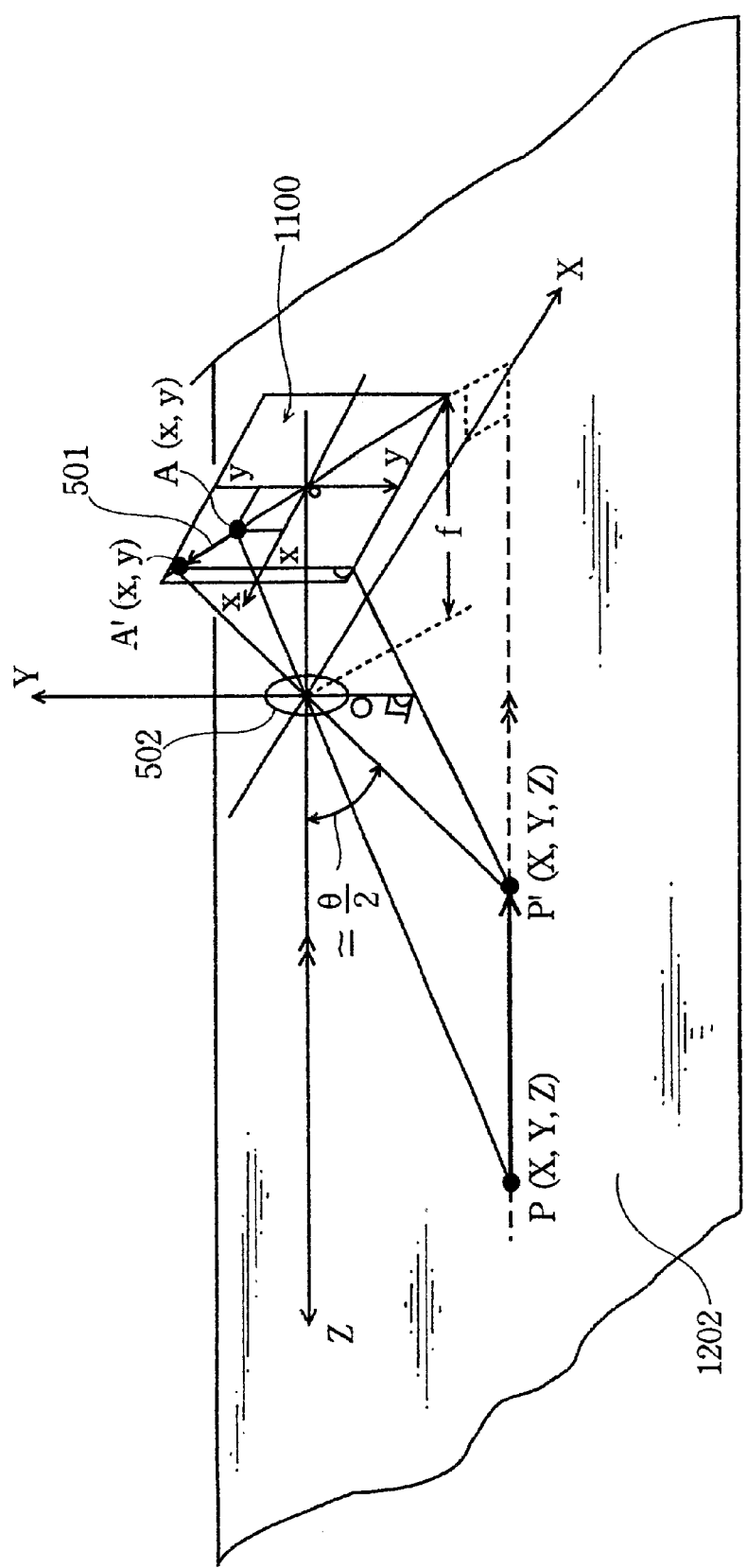
FIG. 5 is a schematic view showing a characteristic point A and an optical flow 501 on an image plane.

FIG. 5 is a schematic view showing the characteristic point A and the optical flow 501 on the image plane 1100. In FIG. 5, a reference character 502 indicates a lens of a camera of the image taking means 101, P indicates a running position of the following vehicle 1101 at a time-point, P' indicates a running position of the following vehicle 1101 at the next time-point, i.e., Δt later, when the next image is taken, A indicates the point, on the image plane 1100, corresponding to the point P, A' indicates the point, on the image plane 1100, corresponding to the point P', and f indicates a distance from the lens 502 to the image plane 1100. For simplification, the Z-axis is set parallel to the running direction of the following vehicle 1101, and the image plane 1100 is arranged perpendicularly to the Z-axis.

Based on FIG. 5, the following equations are obtained:

$$x = fX/Z \tag{1}$$

$$X' = \{(\Delta x/\Delta t) \cdot Z + Z'\}/f \tag{2}$$

$$u = \Delta x/\Delta t \tag{3}$$

$$Z = (fX' - x \cdot Z')/u \tag{4}$$

Here, because Z' is a relative speed between the following vehicle 1101 running the neighboring lane and the own vehicle 1103, Z' is replaced as follows:

$$Z' = -\alpha \tag{5}$$

the equation (4) becomes:

$$Z = (fX' + x \cdot \alpha)/u \tag{6}$$

Accordingly, the x component (i.e., Δx/Δt=u) of the optical flow 501 becomes:

$$u = (fX' + x \cdot \alpha)/Z \tag{7}$$

Also, the U component (i.e., Δy/Δt=v) of the optical flow 501 becomes:

$$v = (fY' + y \cdot \alpha)/Z \tag{8}$$

Here, in almost all cases, the following vehicle 1101 would catch up with the own vehicle 1103, while going straight in the neighboring lane 1204. Therefore, its moving direction would be almost parallel to the Z-axis, and, in other words, a speed in the X-axis direction, i.e., the lateral direction, would be far smaller than the running speed, i.e., a speed in the Z-axis direction. Therefore, the X component of the optical flow 501 of the following vehicle 1101 can substantially be neglected.

And, importance of calculating movement of the following vehicle 1101 in the Y-axis direction, i.e., the vertical direction, would be lower than that of the X-axis direction.

As above, movement of the following vehicle 1101 in the X-axis and Y-axis directions can be neglected. Accordingly, when X'=0 and Y'=0 are substituted in the equations (7) and (8), respectively, the following simple equations can be given:

$$u = x \cdot \alpha/Z \tag{9}$$

$$V = y \cdot \alpha/Z \tag{10}$$

After the above, the following vehicle 1101 being catching up with the own vehicle 1103 will enter the dead angle area 1200 of the image taking means 101, and finally whole of the following vehicle 1101 will enter the dead angle area 1200, that is, the following vehicle 1101 will completely disappear from the image taking area of the image taking means 101. As already described, the dead angle area located vehicles-distance calculating means 105 can calculate a position of the completely disappeared following vehicle 1101 at the time-point of the disappearance.

That is, as shown in FIGS. 2–4, the dead angle area located vehicles-distance calculating means 105 reads the coordinates (x, y) of the characteristic point A (i.e., the corresponding point A' in FIG. 5) on the image plane 1100 of the image taken at the time-point of one frame prior to the disappearance and, first of all, detects the position P' (X, Y, Z), more specifically the vehicles-distance L1 shown in FIG. 2, of the following vehicle 1101 by calculating in accordance with geometrical positional relationship on the basis of the coordinates (x, y), a horizontal view angle θ of the image taking area of the image taking means 101, and a road width W.

More specifically, the coordinates (x, y) of the starting point of the optical flow, which has arisen just before outwardly disappearing from the right or left edges of the image plane, shall be regarded as having arisen at the right or left edges, that is, shall be regarded as having arisen at the ends of the horizontal view angle θ of the image taking means 101 (e.g., a CCD camera). Here, the own vehicle and the following vehicle are both running at the center of the traffic lane. Since the road width W of a highway, for example, should generally have a constant standard value (e.g., 3.5 m), the vehicles-distance L1 can be obtained by the following equation with use of the predetermined horizontal view angle θ and the above road width W.

$$L1 = W/\tan(\theta/2) \tag{13}$$

Otherwise, the vehicles-distance L1 can be given by obtaining (θ/2) from an equation of (θ/2)=tan$^{-1}$(x/f) for the point A'(x, y) as shown in FIG. 5 and then by substituting the given value of (θ/2) in the equation (13).

Further, the above-detected vehicles-distance L1 and the optical flow (u, v) having arisen at the coordinates (x, y) just on the right or left edges of the image plane are substituted in the equations (9) and (10), which are further rearranged to give the relative speed as follows.

$$\alpha = u \cdot L1/x \tag{11}$$

$$\alpha = v \cdot L1/y \tag{12}$$

Here, after the disappearance of the optical flow 501 the following vehicle 1101 could generally be considered to remain running with almost the same speed as detected at the time-point of the disappearance of the optical flow 501 since the dangerous state that the following vehicle 1101 is in the dead angle area 1200 of the own vehicle 1103 would be the case that the vehicles-distance between the following vehicle 1101 and the own vehicle 1103 is not so large.

Movement of the following vehicle 1101 could be calculated by using, as initial values, the relative speed α at the time-point just before the disappearance the optical flow 501 and the position P' (X, Y, Z) of the following vehicle 1101 and by assuming that the following vehicle 1101 is running straight and remains running with a constant speed.

That is, the dead angle area located vehicles-distance calculating means 105 carries out a following operation at every predetermined period of ΔT to obtain the vehicles-distance L between the following vehicle 1101 and the own vehicle 1103.

$$\Delta L = \alpha \cdot \Delta T$$

$$L = L1 - \Delta L$$

$$= L1 - \alpha \cdot \Delta T$$

Here, by using a plurality of optical flows including the optical flow formed just before the disappearance, a relative acceleration (or the changing rate of the relative acceleration by using three or more optical flows) is obtained from relative speeds corresponding to the plurality of optical flows. Therefore, the vehicles-distance L (or the relative position of the following vehicle 1101) after the time-point of the disappearance of the optical flow can be precisely calculated on the basis of a relative speed expected from the relative acceleration (or the changing rate of the relative acceleration).

Further, by taking into account the direction change of a plurality of optical flows including the optical flow formed just before the disappearance, a direction change value (or the changing rate of the direction change value by using three or more optical flows) of the plurality of optical flows is obtained. Therefore, a relative traveling direction of the following vehicle 1101 relative to the own vehicle 1103 is expected whenever, for example, the following vehicle 1101 changes its traveling direction. Therefore, the vehicles-distance L (or the relative position of the following vehicle 1101) after the time-point of the disappearance of the optical flow can be more precisely calculated on the basis of both the expected relative speed and the expected relative traveling direction.

Further, the dangerousness judging means 107 judges whether or not the above-calculated movement of the following vehicle 1101 corresponds to a predetermined dangerous state.

Here, in case that the optical flow 501 at the time-point just before the disappearance has an upward directional component, which happens in such cases that a following vehicle 1301, shown in FIG. 8, running with a low speed on the road making a relatively big curve goes off the own vehicle 1103 and, as a result, goes out of the image plane 1100 or that a following vehicle 1302 leaves along the branch and then goes out of the image plane 1100, it is not necessary to execute the above calculation. Therefore, only in case that the optical flow 501 at the time-point just before the disappearance has a downward directional component, the dead angle area located vehicles-distance calculating means 105 executes the above calculation and, on the bases of the calculation, the dangerousness judging means 107 judges dangerousness. In case of high dangerousness, the alarm giving means 109, i.e., the alarm buzzer 110, provides a driver notice of the dangerousness.

The dangerousness judging means 107 judges degree of approach (i.e., dangerousness) of the following vehicle 1101 running on the neighboring lane 1204 or of another following vehicle (not shown) running at the back of the own vehicle 1103 in response to a situation that the optical flows, such as 500,501 or the like, are going in a diverging direction from the FOE 1208 or going in a converging direction to the FOE 1208. Then, the dangerousness judging means 107 judges that the bigger the optical flows are directed in the diverging direction, the higher the dangerousness is, and raises an alarm.

Execution of a lane change or the like by the own vehicle 1103 in a state that the following vehicle 1101 has entered the dead angle area 1200 of the own vehicle 1103 as shown in FIG. 7 would cause such a severe accident as a collision of the own vehicle 1103 against the following vehicle 1101.

Therefore, in case that an operation for activating the direction indicator 108 provided on the own vehicle 1103 is executed when the following vehicle 1101 is in the dead angel area 1200, the alarm giving means 109 gives a driver an alarm indicating danger by means of such auditory information as sounding the alarm buzzer 110.

Next, action of the vehicle-applied rear-and-side monitoring system, particularly around action for calculating movement of the following vehicle having entered the dead angle, will be described below.

Figure 6:
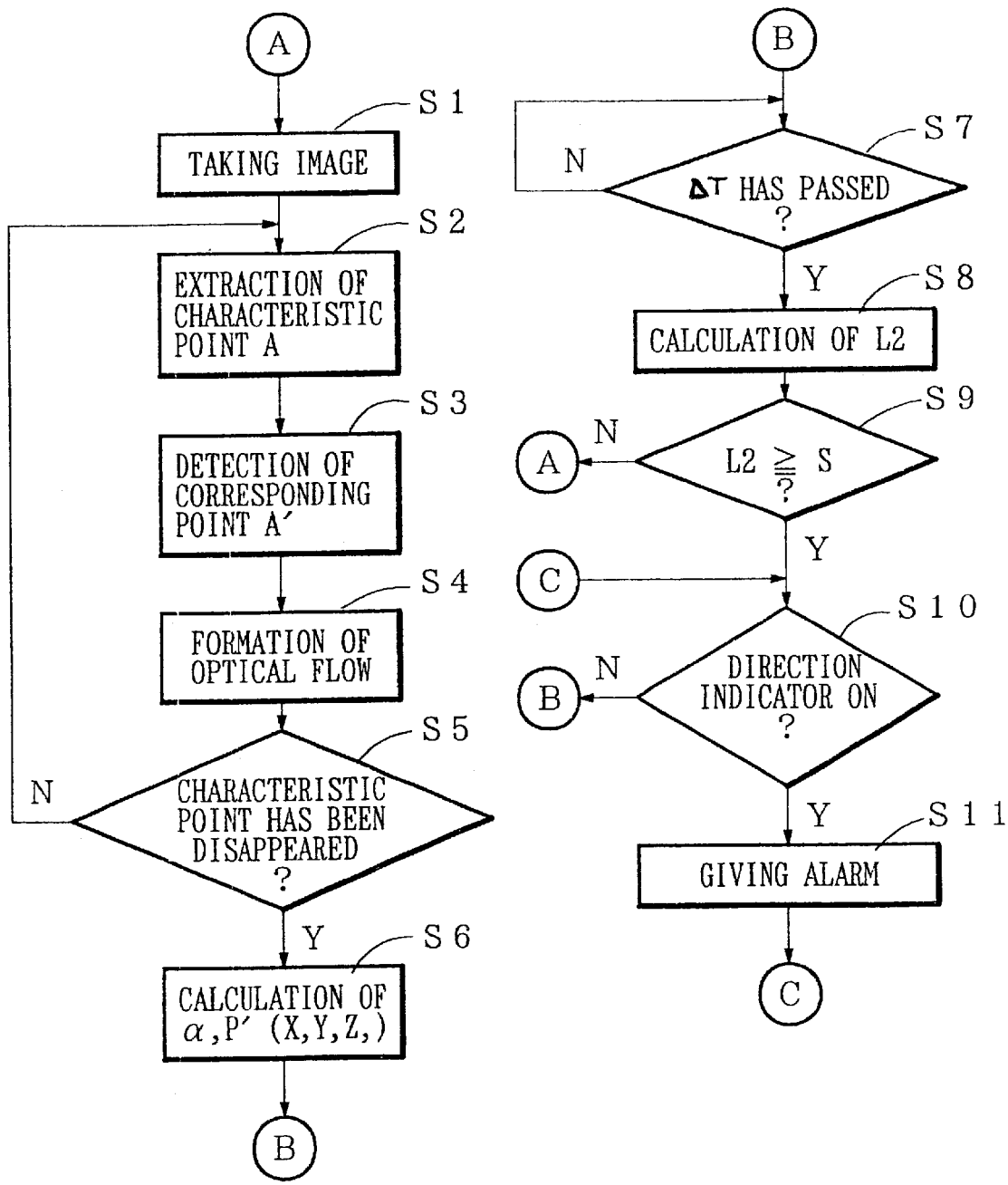
FIG. 6 is a flow chart describing calculation for a movement of the following vehicle having entered a dead angle of the own vehicle.

FIG. 6 is a flow chart describing calculation for a movement of the following vehicle having entered the dead angle of the own vehicle.

First of all, the image taking means 101 takes an image of the rear-and-side view (step 1, hereinafter s1).

The characteristic point extracting means 102 recognizes an image of the following vehicle, running at the back of the own vehicle or on the neighboring lane, from the image of the rear-and-side view and extracts one point as a characteristic point A from the image of the following vehicle (s2).

The corresponding point detecting means 103 detects a corresponding point A', corresponding to the characteristic point A, in the next frame image (s3).

The optical flow forming means 104 forms an optical flow 500 of characteristic point of the following vehicle from a vector starting the characteristic point A to the corresponding point A' (s4).

It is checked whether or not the characteristic point A has disappeared from the image plane (s5).

The dead angle area located vehicles-distance calculating mans 105 calculates a relative speed a and a relative position P' (X, Y, Z) of the following vehicle on the basis of the coordinates A' (x, y) of the corresponding point A' on the image plane (s6).

The dead angle area located vehicles-distance calculating means 105 also calculates the vehicles-distance L between the following vehicle 1101 and the own vehicle 1103 by carrying out an operation of the above equation $L=L1-\alpha \cdot \Delta T$ at every period of $\Delta T$ (s7), and then calculates a distance L2 (FIG. 7) from the front end of the own vehicle to the rear end of the following vehicle by adding the whole length of the own vehicle 1103 to the above vehicles-distance L (s8). The distance L2 is a positive value in case the rear end of the following vehicle is positioned behind the front end of the own vehicle and is a negative value in case the rear end of the following vehicle is positioned in front of the front end of the own vehicle.

The above distance L2 is judged as to whether $L2 \geqq S$ or $L2<S$(s9). Here, S is a safety distance to be predetermined so that, when the own vehicle changes a lane, the own vehicle can have a suitable distance against the following vehicle which has already passed the own vehicle. Accordingly, S is predetermined to a negative value of "−10 m".

"$L2 \geqq S$" (i.e., s9, Y) and "direction indicator 108-ON" (i.e., s10, Y) raise an alarm by means of the alarm giving means 109 (s11). Next, an off-input, however, is given to the direction indicator 108 (i.e., s10, N), the calculation returns to s7.

In case of "L2<S" (i.e., s9, N), which means degree of danger has lowered, the calculation is reset and repeated from s1. In a state of "L2<S", the alarm giving means 109 is not required to give an alarm even though an on-input is given to the direction indicator 108.

The vehicle-applied rear-and-side monitoring system in accordance with the present invention acts as described above for calculating movement of the following vehicle 1101 in the dead angle area 1200.

In the present embodiment, though the rear end portion of the following vehicle 1101 is extracted as the characteristic point A, the characteristic point A is not limited to this point and the front end portion of the following vehicle 1101 may be selected as the characteristic point A. In the latter case, the whole length b of the following vehicle 1101 shall be taken into account.

Although one monitoring camera, i.e., one image taking means 101, is provided in the center of the rear end of the own vehicle 1103 in the present embodiment, the image taking means 101 may be provided on both sides of the rear end of the own vehicle 1103.

Further, the vehicle-applied rear-and-side monitoring system in accordance with the present invention is, off course, applicable to another traffic system having a passing lane on the left.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A vehicle-applied rear-and-side monitoring system, comprising:

an image taking means for talking an image of rear-and-side view of a first vehicle traveling in a lane;

a characteristic point extracting means for extracting at least one point as a characteristic point from an image of a second vehicle contained in a first image, taking at a first time-point, of said rear-and-side view, said second vehicle traveling at the rear of said first vehicle in said lane or in a neighboring lane of said lane;

a corresponding point detecting means for detecting a corresponding point, corresponding to said characteristic point, in a second image taken at a second time-point following said first time-point;

an optical flow forming means for forming an optical flow of said characteristic point of said second vehicle from a vector connecting said characteristic point and said corresponding point; and a dead angle area located vehicles-distance calculating means for calculating at least any one of a vehicles-distance between said first and second vehicles and a relative position therebetween after a time-point of disappearance of said optical flow outside an image plane of said image taking means on the basis of said optical flow formed just before said disappearance, wherein an approaching degree of said second vehicle traveling at the rear of said first vehicle in said lane or in said neighboring lane is monitored.

2. The vehicle-applied rear-and-side monitoring system as claimed in claim 1, wherein said dead angle area located vehicles-distance calculating means considers that said optical flow of said characteristic point of said second vehicle having arrived at a predetermined peripheral area of said image plane of said image taking means at said first time-point disappears from said image plane at said second time-point, uses said optical flow at said first time-point as said optical flow formed just before said disappearance, and calculates at least any one of said vehicles-distance and said relative position after said first time-point or after said second time-point.

3. The vehicle-applied rear-and-side monitoring system as claimed in claim 1, further comprising:

a dangerousness judging means for judging a degree of danger of contact or collision with said second vehicle on the basis of said vehicles-distance and said relative position having been calculated by said dead angle area located vehicles-distance calculating means.

4. The vehicle-applied rear-and-side monitoring system as claimed in claim 1, further comprising:

an alarm giving means for giving an alarm indicating danger by means of at least any one of auditory information and optical information whenever an operation for activating a direction indicator provided on said first vehicle is executed when said vehicles-distance or said relative position having been calculated by said dead angle area located vehicles-distance calculating means if within a predetermined range.

5. The vehicle-applied rear-and-side monitoring system as claimed in claim 2, wherein said dead angle area located vehicles-distance calculating means calculates neither said vehicles-distance nor said relative position after said first time-point or after said second time-point whenever said optical flow having arrived at said predetermined peripheral area of said image plane of said image taking means at said first-time point has a directional component corresponding to a direction within a range between horizontal and upward-vertical in said rear-and-side view, and calculates at least any one of said vehicles-distance and said relative position after said first time-point or after second time-point whenever said optical flow having arrived at said predetermined peripheral area of said image plane of said image taking means at said first time-point has a directional component corresponding to a direction within a range between horizontal (not included) and downward-vertical in said rear-and-side view.

6. The vehicle-applied rear-and-side monitoring system as claimed in claim 1, further comprising:

a second alarm giving means for giving an alarm indicating danger of a lateral collision by means of at least any one of auditory information and optical information whenever an operation for a lane change is executed within a predetermined time period from said time-point of said disappearance of said optical flow from said image plane of said image taking means.

7. The vehicle-applied rear-and-side monitoring system as claimed in claim 2, further comprising:

a second alarm giving means for giving an alarm indicating danger of a lateral collision by means of at least any one of auditory information and optical information whenever an operation for a lane change is executed within a predetermined time period from said time-point of said disappearance of said optical flow from said image plane of said image taking means.

8. The vehicle-applied rear-and-side monitoring system as claimed in claim 3, further comprising:

a second alarm giving means for giving an alarm indicating danger of a lateral collision by means of at least any one of auditory information and optical information whenever an operation for a lane change is executed within a predetermined time period from said time-point of said disappearance of said optical flow from said image plane of said image taking means.

9. The vehicle-applied rear-and-side monitoring system as claimed in claim 4, further comprising:

a second alarm giving means for giving an alarm indicating danger of a lateral collision by means of at least any one of auditory information and optical information whenever an operation for a lane change is executed within a predetermined time period from said time-point of said disappearance of said optical flow from said image plane of said taking means.

10. The vehicle-applied rear-and-side monitoring system as claimed in claim 5, further comprising:

a second alarm giving means for giving an alarm indicating danger of a lateral collision by means of at least any one of auditory information and optical information whenever an operation for a lane change is executed within a predetermined time period from said time-point of said disappearance of said optical flow from said image plane of said image taking means.

11. A vehicle-applied rear-and-side monitoring system, comprising:

an image taking means for taking an image of a rear-and-side view of a first vehicle traveling in a lane;

a characteristic point extracting means for extracting at least one point as a characteristic point from an image of a second vehicle contained in a first image, taken at a first time-point, of said rear-and-side view, said second vehicle traveling at the rear of said first vehicle in said lane or in a neighboring lane of said lane;

a corresponding point detecting means for detecting a corresponding point, corresponding to said characteristic point, in a second image taken at a second time-point following said first time-point;

an optical flow forming means for forming an optical flow of said characteristic point of said second vehicle from a vector connecting said characteristic point and said corresponding point; and a dead angle area located vehicles-distance calculating means for calculating at least any one of a vehicles-distance between said first and second vehicles and a relative point therebetween after a time-point of disappearance of said optical flow outside an image plane of said image taking means on the basis of a plurality of optical flows including said optical flow formed just before said disappearance, wherein an approaching degree of said second vehicle traveling at the rear of said first vehicle in said lane in said neighboring lane is monitored.

12. The vehicle-applied rear-and-side monitoring system as set forth in claim 11, wherein the dead angle located vehicles-distance calculating means calculates the vehicles-distance or the relative position on the basis of a relative speed expected from a relative acceleration obtained from relative speeds corresponding to the plurality of optical flows.

13. The vehicle-applied rear-and-side monitoring system as set forth in claim 12, wherein the dead angle area located vehicles-distance calculating means calculates the vehicles-distance or the relative position on the basis of both the expected relative speed and a relative traveling direction, of a second vehicle relative to a first vehicle, expected from direction change values of the plurality of optical flows.

\* \* \* \* \*